E. G. MATTHEWS.
PLOW
No. 187,160.　　　　　　　　　　　Patented Feb. 6, 1877.
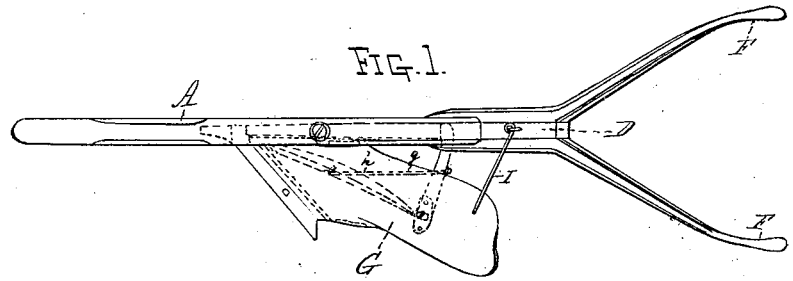
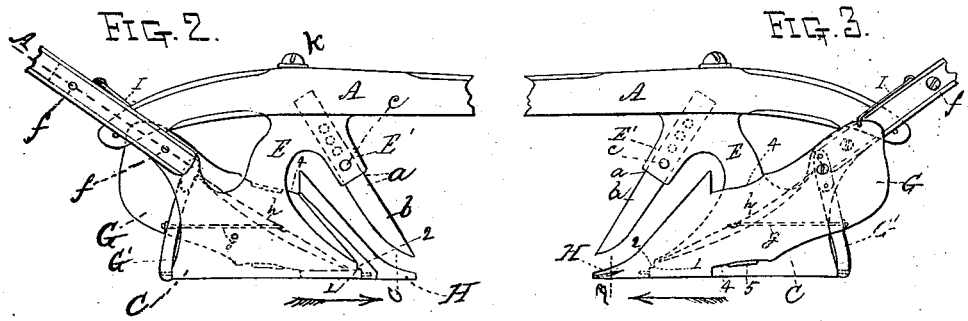
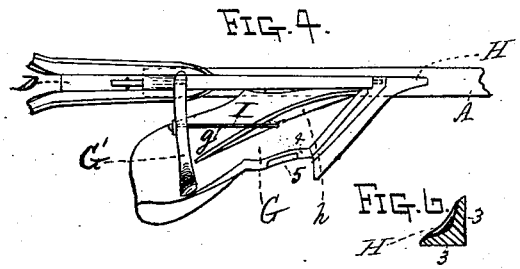 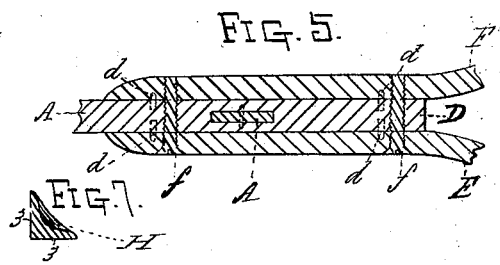
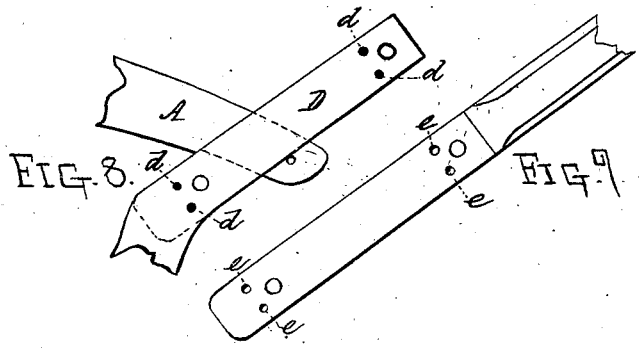
WITNESSES:
Edwin E. Moore
Thos. H. Dodge
INVENTOR:
Elbridge G. Matthews

UNITED STATES PATENT OFFICE.

ELBRIDGE G. MATTHEWS, OF OAKHAM, MASSACHUSETTS.

IMPROVEMENT IN PLOWS.

Specification forming part of Letters Patent No. 187,160, dated February 6, 1877; application filed November 2, 1876.

*To all whom it may concern:*

Be it know that I, ELBRIDGE G. MATTHEWS, of Oakham, in the county of Worcester and Commonwealth of Massachusetts, have invented certain new and useful Improvements in Plows; and I do hereby declare that the following is a full, clear, and exact description of the same, reference being had to the accompanying drawings, forming a part of this specification, and in which—

Figure 1 represents a top or plan view of a plow with my improvements applied thereto. Fig. 2 represents a side (land) view of the plow. Fig. 3 represents a view of the opposite side of the plow. Fig. 4 represents a bottom view of the plow. Fig. 5 represents, upon an enlarged scale, a section on line A, Fig. 2. Figs. 6 and 7 represent, upon an enlarged scale, a section on line B, Fig. 3, and also on line C, Fig. 2. Fig. 8 represents, upon the same enlarged scale, a side view of a section of the standard with one of the handles removed, as will be hereafter explained, and Fig. 9 represents the lower part of one of the handles detached from the handle-standard shown in Fig. 8, as will hereafter be more fully described.

To enable those skilled in the art to which my invention belongs to make and use the same, I will proceed to describe it more in detail.

In the drawings, the part marked A represents the plow-beam; C, the cast-iron frame of the plow, to which the plow-beam and handles are secured, the rear end of the plow-beam being secured to the upwardly-projecting handle-standard part D by passing through a mortise therein, as indicated by dotted and full lines in the drawings, while the central part of the plow-beam is secured to the upwardly-projecting neck part E of the frame C. The neck E has a downwardly-projecting cutter-sheath, E', cast thereon to receive the shank part *a* of the cutter *b*, the shank *a* of cutter *b* being provided with a series of holes, so that it can be adjusted up or down by means of the adjusting-bolt *c*, which passes through the neck part E'. By this arrangement the cutter *b* is always retained in its proper relative position as respects the point of the plow, thus obviating the objections to those plows which support the cutter from the beam, which is liable to spring and work out of line with the point of the plow.

The standard D is provided with stay-pins *d* upon each side to enter the holes *e* in the insides of the lower parts of the handles F F, whereby the handles are securely held in position, and the holding-bolts *f f*, which pass through the standard D and the lower ends of handles F F, are relieved from much strain and liability to break when the plow is in use.

The mold-board G is swiveled or hinged to the point of the frame or land-side C, and also to the rear of said land-side by means of the brace G', which is fastened to the rear inside of the mold-board at its upper end, and is also secured near its center to the mold-board by means of a metallic rod, *g*, the front end of which rod hooks into a slot in the center of the curved rib *h* cast upon the inside of the mold-board, said rib serving the double function or purpose of staying brace G', and also of strengthening the mold-board longitudinally, whereby the mold-board can be made much lighter than it can when made in the ordinary manner.

In the use of swivel-plows the front connection of the mold-board to the land-side has heretofore been made by a pin projecting from the land-side into the point of the mold-board, which supports the point of the plow. This mode of connection, however, is quite objectionable, owing to the liability of the pin springing or breaking. To obviate this objection I cast the front of the land-side with a rounded shoulder, 1, and the mold-board with a corresponding curved or concaved shoulder, 2, whereby the strain in using the plow is borne principally by the shoulders 1 and 2, thereby relieving the swivel-pin from strain and liability to break.

It has been found that one great cause of breakage in swivel-plows results from earthy substances accumulating upon the land-side, thereby preventing the edge 4 4 of the mold-board from coming up close against the land-side when reversed, and the attendant, in order to insert the holding-hook 1, springs the rear part of the mold-board for that purpose, thereby subjecting the plow to breakages from any sudden concussion when in use.

To prevent such results I cast the mold-board G with a sharp edge or knife, 5, the sides being beveled off or in wedge shape, whereby when the mold-board is turned to either side said knife-edge 5 will penetrate and cut through any clayey or earthy substance which may be adhering to the land-side or frame C, thus insuring the mold-board to be hooked into its proper relative position without being strained or sprung, as heretofore.

I am aware that it is not new to support the cutter in a socket cast with the land-side, nor is it new to form the plow-beam with a socket, and, therefore, I do not claim such device or devices broadly, but limit my claim to my particular construction and arrangement of parts, as shown and described.

Having described my improvement in plows, what I claim therein as new and of my invention, and desire to secure by Letters Patent, is—

1. In a side-hill plow, the frame or land-side plate, constructed as described, with the rear handle extension D, and the neck E, carrying the cutter-socket E', formed rigidly thereon, and arranged to be secured to the under side of the plow-beam, substantially as and for the purposes set forth.

2. The combination with the reversible mold-board G of the knife or beveled edges 5 5, substantially as and for the purposes set forth.

3. The combination, with the point H and mold-board G, of the supporting and bearing curved shoulders 1 and 2, substantially as and for the purposes set forth.

ELBRIDGE G. MATTHEWS.

Witnesses:
EDWIN E. MOORE,
THOS. H. DODGE.